United States Patent [19]

Champagne et al.

[11] Patent Number: 4,908,816
[45] Date of Patent: Mar. 13, 1990

[54] VOICE COIL MOTOR WITH LINEARIZED FORCE CONSTANT

[75] Inventors: Patrick J. Champagne, Cupertino; John L. Grimsley, Los Altos, both of Calif.

[73] Assignee: Laserdrive Limited, Santa Clara, Calif.

[21] Appl. No.: 287,798

[22] Filed: Dec. 20, 1988

[51] Int. Cl.[4] .................. G11B 7/00; G11B 5/54; G11B 21/08
[52] U.S. Cl. .................... 369/215; 310/12; 360/106; 360/109; 369/219; 369/249
[58] Field of Search ............... 361/215, 219, 221, 224, 361/249; 360/75, 106, 109; 310/12

[56] References Cited

U.S. PATENT DOCUMENTS

| 4,462,054 | 7/1984 | Dong et al. ............... 310/12 |
| 4,583,212 | 4/1986 | Koide et al. ............... 369/219 |
| 4,594,627 | 6/1986 | Yiskochil et al. ............... 310/12 |
| 4,740,946 | 4/1988 | Yumura et al. ............... 369/219 |
| 4,791,508 | 12/1988 | Augeri et al. ............... 360/75 |
| 4,792,707 | 12/1988 | Katanuma ............... 310/12 |
| 4,823,219 | 4/1989 | Ueda et al. ............... 360/106 |
| 4,823,336 | 4/1989 | Inada et al. ............... 369/215 |

Primary Examiner—Steven L. Stephan
Attorney, Agent, or Firm—Townsend and Townsend

[57] ABSTRACT

A linear motor with uniform force constant across the full stroke length achieved by varying the width of the air gap face area of the permanent magnet such that the width is reduced towards the center of the magnet in relation to the widths at the ends thereof to compensate for reducing field strength at the magnet ends caused by fringing effects on the field.

1 Claim, 4 Drawing Sheets

VOICE COIL MOTOR WITH LINEARIZED FORCE CONSTANT

CROSS REFERENCE TO RELATED APPLICATION

Reference is made to U.S. application Ser. No. 287,801, entitled SINGLE STAGE TRACKING ACTUATOR APPARATUS FOR OPTICAL BEAM INFORMATION STORAGE APPARATUS by Ingolf Sander and Patrick J. Champagne and filed concurrently herewith.

FIELD OF THE INVENTION

This invention relates to improved voice coil motors and more particularly to the improvement of efficiency in a size-constrained voice coil motor by the provision of a linearized force constant over the stroke length of the motor. Although of general utility, a voice coil motor of the type contemplated is particularly useful as a tracking actuator for an optical beam addressable information storage disk drive apparatus.

BACKGROUND OF THE INVENTION

High speed actuators are desirable in information storage disk drive systems to reduce access times during track seek operations thereby providing improved system data throughput performance. As is known, the speed of the actuator is directly related to the force that the motor can apply to the moving mass of the disk read mechanism since greater forces produce greater accelerations and thus reduce the time required to move the read mechanism from one data track on the disk to another, an operation commonly referred to as a "seek".

The use of linear ("voice coil") motors as disk drive actuators is well known. In this type of motor, the force generated is proportional to the number of turns in the electromagnetic drive coil, the amount of current flowing in the wire of the coil and the strength of the magnetic field through which the wire passes. As the actuator moves through its stroke, the coil and its current may be thought of as being constant while the magnetic field generally tends to diminish ("roll off") towards the extreme positions of the field. This is due to flux leakage occurring at the ends of the magnetic circuit where the geometry of the circuit inherent provides additional leakage path. Servo control circuits used to drive actuators usually must operate with reduced overall performance in order to accommodate this reduction in available acceleration/deceleration capability at the ends of the stroke. It is desirable therefore that forces in voice coil actuators be made uniform or constant to improve the operating performance of the actuator.

One known approach to making the forces uniform in this type of actuator is to lengthen the magnetic circuit is order to move the ends, and therefore the end effects, outward well past the travel of the actuator coil where these end effects then have less effect on usable stroke. This approach has the disadvantage of increasing the total flux generated within the magnetic circuit therefore increasing the total flux that must be carried by the center pole of the circuit. This additional flux requires that a center pole with a larger cross section be used. This in turn would mean that the diameter of the coil would have to be increased to encompass the larger center pole. Another approach, to compensate for larger magnetic circuits, is to decrease the average flux density of the field of the circuit. The end result of these approaches is either an increase in size of the coil with consequent unwanted increase in moving mass or an overall decrease in the forces produced by the motor.

A second approach has been to vary the size of the magnetic gap in which the coil travels along its stroke. A narrower gap at the ends of the stroke increases the flux density in these regions thus reducing the end effects. However, this approach has the disadvantage of aggravating clearance and tolerance problems and is generally not considered practical to implement in volume manufacturing operations.

It is therefore an object of the invention to provide an improved voice coil motor with a uniform force constant which avoids the problems and disadvantages of the prior art.

It is another object of the invention to provide an improved voice coil motor of the type described that maximizes the efficiency of a size-constrained design.

It is yet another object of the invention to provide a tracking actuator for an optical beam addressable information storage disk drive system utilizing an improved voice coil motor of the type described.

SUMMARY OF THE INVENTION

In accordance with the invention, a uniform force constant throughout the stroke of a voice coil motor is achieved by shaping the air gap face area of the motor magnet to reduce the face width of the magnet between the ends thereof thereby to reduce the amount of material and therefore the field strength intermediate the ends of the magnet. The increase in field strength at the ends of the magnet relative to the field in the central portion offsets the effective roll-off of field strength that would occur near the ends of the coil stroke with a conventional magnet of the same length.

The result of employing a shaped magnet in this manner is a magnetic circuit in which the field strength is both relatively high and constant over the full stroke of the motor coil but which does not need to extend much beyond the ends of travel of the coil. For any given application, this minimizes the total flux generated and therefore the required cross section of the center pole as well as limiting the length of the magnet and the corresponding length of the overall magnetic structure. The resulting compact and efficient voice coil motor is particularly suitable for use as an actuator in an optical beam addressable information storage drive systems such as might be used in a half-height configuration of a personal computer where compactness and operating efficiency are critical design criteria.

DETAILED DESCRIPTION

Figure 1:
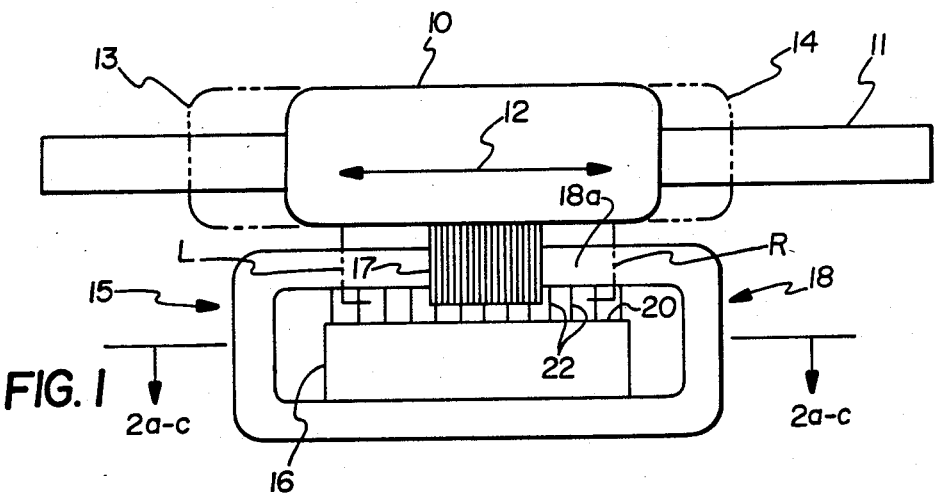
FIG. 1 is a top schematic view of the basic components of a carraige mechanism and attached voice coil motor useful in explaining the present invention.
Figure 2A:
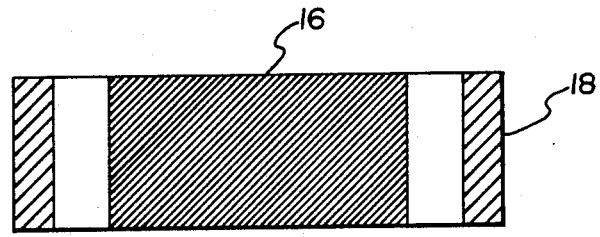
FIGS. 2A and 2B are cross section views of prior art permanent magnet and pole configurations useful in the voice coil motor of FIG. 1.
Figure 2B:
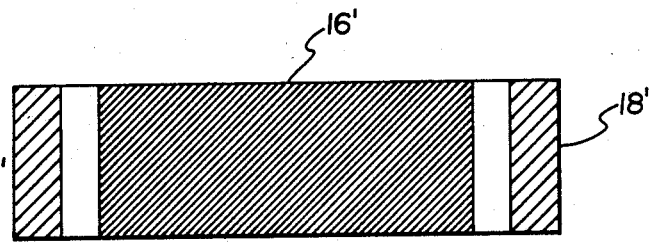
Figure 3A:
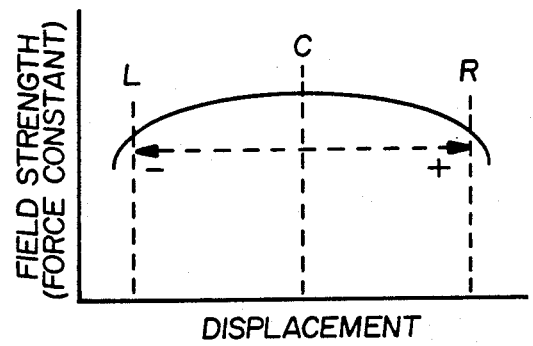
FIGS. 3A-3C are graphs of field strength vs stroke displacement for each of the magnet/pole configurations of FIGS. 2A-2C.
Figure 3B:
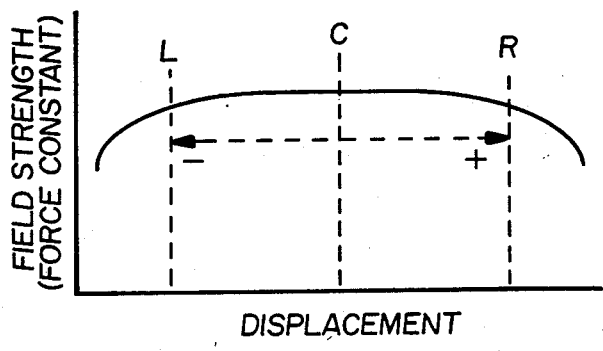

Referring jointly to FIGS. 1 and 2A, a carriage mechanism 10 is mounted on a track 11 by suitable friction reducing means such as ball bearing rollers (not shown) and is adapted for translation along a stroke path 12 bounded by end extremes 13 and 14 as shown in phantom. A voice coil motor 15 is provided to move carriage 10 through its stroke path and includes permanent magnet 16, electromagnetic coil 17 and central pole 18. Face area 20 of magnet 16 is spaced from pole leg 18a to form an air gap across which exists a magnetic field extending perpendicularly between face area 20 and leg 18A as represented by flux lines 22. In the exemplary arrangement shown, coil 17 is formed around pole leg 18A and is attached on one side by suitable means, such as an adhesive, to the side of carriage 10. As is well known, when a current is passed through coil 17, and in particular, through the turn segments perpendicular to the magnetic field flux in the air gap, an electromotive force is created which drives coil 17 longitudinally along the air gap, the direction being dependent on the direction of the current through the coil. Ideally, for a given current through coil 17 and a magnet material with uniform magnetism, the force on the coil should be the same at any point along its stroke between extremes L and R. However, because of fringing effects that occur at and near the ends of the magnet, the force tapers off as the coil approaches the extremes of the stroke. This is shown in the graph of FIG. 3A illustrating the variation of field strength as a function of displacement from center of stroke C. As seen in FIGS. 2B and 3B, extending the length of the magnet 16' has the effect of providing a more linear field strength throughout the stroke length L to R by relocating the fringe effects substantially outside of the stroke. However, the larger magnet increases the total flux in the circuit which requires that a pole 18' with a larger cross section be used as can be seen by comparison of FIGS. 2A and 2B.

Figure 2C:
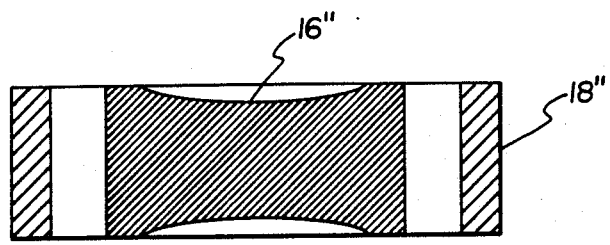
FIG. 2C is a cross section similar to FIGS. 2A and 2B but with the configuration of the permanent magnet modified in accordance with the teachings of the invention.
Figure 3C:
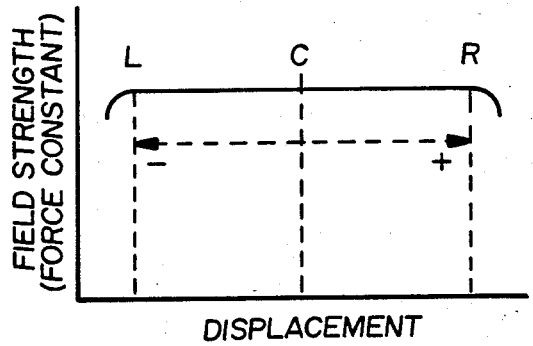

In accordance with the invention, and with reference to FIGS. 2C and 3C, it has been found that a substantial improvement in linearizing of the field strength across the stroke can be achieved without increasing the overall length of the magnetic circuit by modifying the shape of the face area of the magnet 16" such that the width is reduced in the central portion so as to be shorter than at the ends the ends thereof. The effect of this is to provide a strong field at the ends of the magnet relative to the central portion thereby effectively offsetting the effect that end field fringing would have on the linearity of the field in the stroke region L to R, as can be seen with reference to FIG. 3B. This arrangement allows the use of a center pole 18" with the same cross section as pole 18 used with the conventional magnet 16 in FIG. 2A. A particular advantage of this approach, as compared to use of the previously described variable gap width, is that the arcuate upper and lower surfaces of magnet 16" can be formed on a reliably repetitive basis by relatively low cost sintering techniques as compared to the more costly grinding process commonly used to form the face of the magnet. The amount and configuration of the reduction along the length of the magnet is preferably determined in relation to the coil size and stroke length for a specific application so as to realize a substantially uniform force constant throughout the full stroke of the coil in the motor, the arcuate configuration being suitable for most applications.

Figure 4:
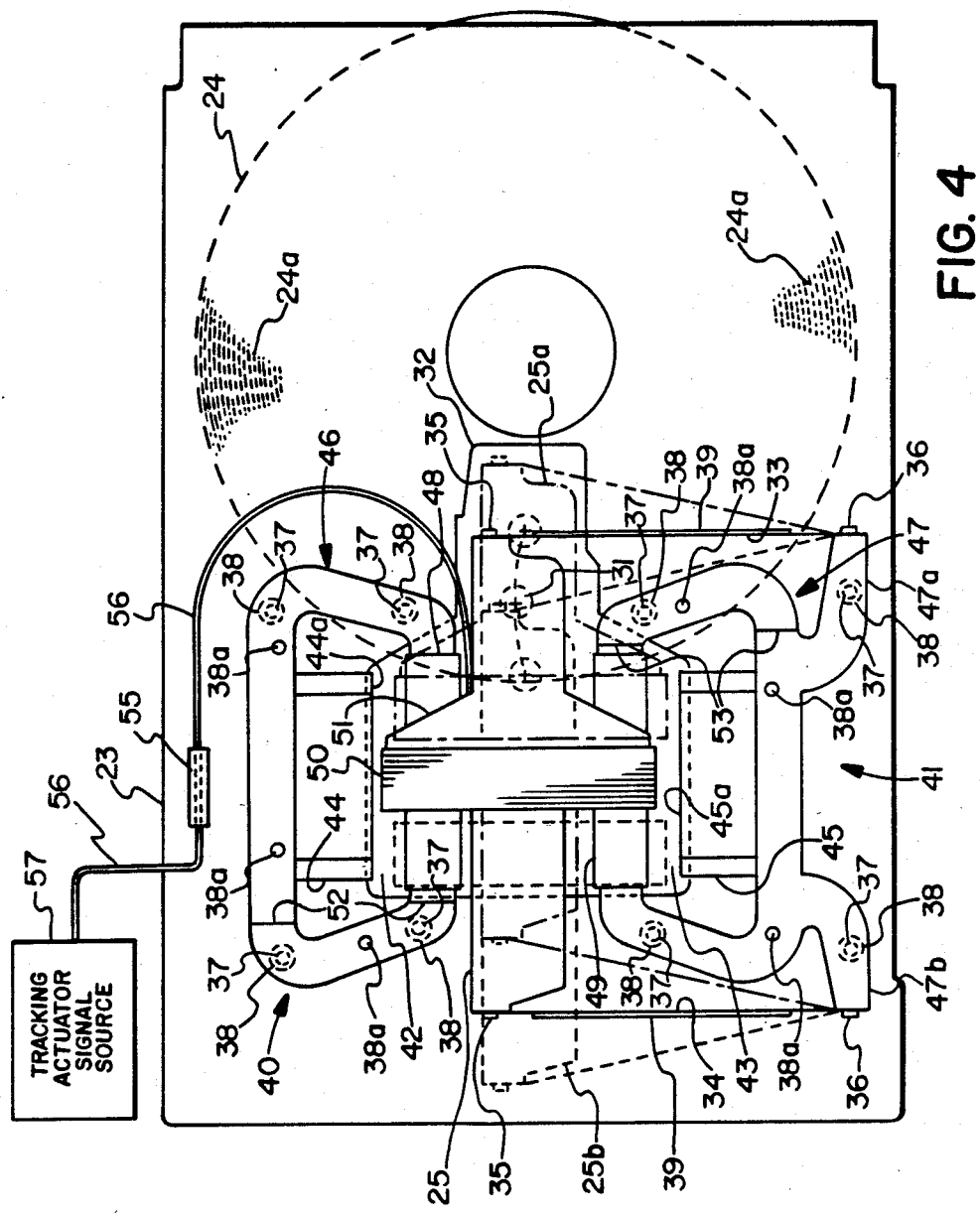
FIG. 4 is a plan view from the bottom of a magneto-optical drive system incorporating tracking actuator apparatus constructed in accordance with the present invention.
Figure 5:
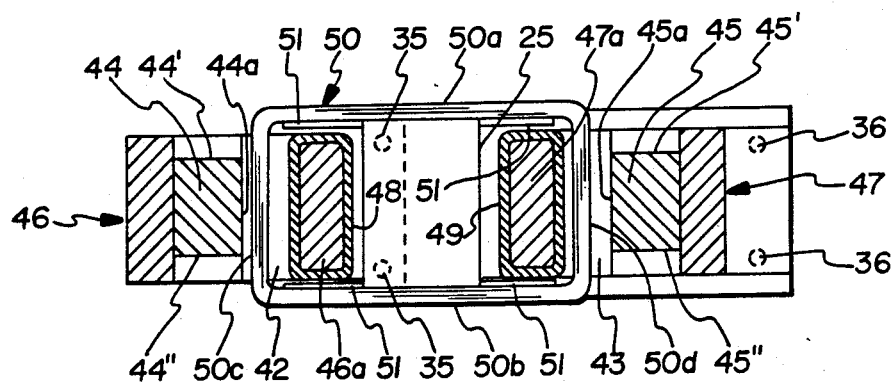
FIG. 5 is an elevation view of the tracking actuator apparatus of FIG. 4 seen in cross section taken midway between the front and rear end portions of the magneto-optical read/write head.
Figure 6:
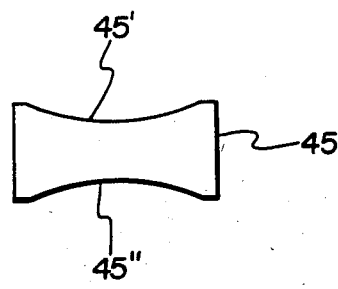
FIG. 6 is a side view of a modified face area magnet used in the tracking actuator of FIG. 4 in accordance with the invention.

Referring now to FIGS. 4–6, there is shown single stage tracking actuator apparatus embodying the invention for driving a read/write head 25 of a magneto-optical disk drive system. Head 25, preferably made of magnesium, includes optical read/write components for generating a laser beam focused by objective lens 31 through an aperture 32 in system mount plate 23 onto data tracks 24a of magneto-optical disk 24. A more complete description of the optical structure of head 25 may be found in copending U.S. patent application Ser. No. 234,767 filed Aug. 8, 1988.

Flexure means including a pair of elongated, flat leaf springs 33,34 are provided to hold head 24 suspended under mount plate 23 with smooth, friction-free translatable motion along a stroke path between extremes 25a,25b. To this end, the free ends of springs 33,34 are secured to opposite ends of head 25 by suitable means such as bolts 35. The distal fixed ends of springs 33,34 are secured to mount plate 23 near the side thereof by bolts 36 affixed to extension arms 47a and 47b of ring core 47, which, in turn, is bolted by bolts 37 onto positioning pads 38 formed on the undersurface of mount plate 23. Similar bolts and mount pads are used to mount core 46 to mount plate 23. Holes 38a may also be provided in cores 46 and 47 to mate with precision locator pins depending from the bottom of mount plate 23. Leaf springs 33,34 may be formed of stainless spring steel on the order of 0.002–0.003 inches thick. In a preferred form of the invention, each of the springs has a laminate of constrained layer damping material 39 adhesively secured to the flat surfaces of the springs to dampen resonances in the springs during high frequency translating movement of head 25.

Magnetic circuit means 40 and 41, comprised of separate assemblies of an elongated magnet 44 with ring core 46 and an elongated magnet 45 with ring core 47, respectively, are provided for establishing a pair of mutually isolated magnetic fields across a pair of elongated air gaps 42,43 on opposite sides of head 25. Magnets 44 and 45 are secured by suitable means, such as an adhesive, to the inner surface of the outer legs of each core and are magnetized in a direction perpendicular to the gap faces 44a and 45a respectively. The magnets are spaced from the inner legs of each core thus forming air gaps 42,43 with the magnetic field flux lines extending thereacross. In across with a feature of the invention, the vertical outline of each of the magnetic 44,45, in the elongated direction, as represented by magnet 45 illustrated in FIG. 6 is somewhat in the shape of a bow tie, with upper and lower surfaces 45' and 45" (similarly for magnet 44) gradually increasing arcuately from the center to the outer ends to provide mirror image concave upper and lower surfaces. As described above in connection with the voice coil motor of FIG. 1, this configuration for the magnets is selected to provide a more uniform net force constant across the full range of skewing of the leaf springs 33,34 as head 25 is driven through the full length of its stroke path between extremes 25a and 25b. To reduce the inductance of the coil, copper sleeves 48 and 49 are formed about the shorter legs of ring cores 46 and 47, respectively, to serve as conventional shorted turns.

The tracking actuator also includes an electromagnetic coil 50, preferably of elongated rectangular cross section with elongated side turns 50a,50b (FIG. 5) secured by suitable means, such as an adhesive, to the upper and lower surfaces of head 25 supported by laterally extended wings 51 above and below the head. The end turn segments 50c,50d of coil 50 are disposed in air gaps 42,43, respectively, with the wire of the end turns perpendicular to the flux lines across the gaps. Additionally, the assembly of head 25 with the magnetic circuit means 40,41 is such that the coil end turn segments 50c,50d are centrally positioned, front to rear, in the air gaps when flexure leaf spring are in the at-rest, unstressed position. As best seen in FIG. 4, because of the slightly arcuate nature of the stroke path for head 25, the magnet-to-pole air gap width is made sufficiently wide to accommodate the effective side-to-side motion of the coil end turns in the air gap as the head is translated back and forth. Similarly, the lateral spacing between the inner legs 46a,47a is chosen to accommodate the lateral motion of head 25 resulting from the slightly arcuate nature of the stroke path. A side leg of each ring core is removable, as at junctures 52 and 53, to allow assembly of the coil 50 with the end turn segments in air gaps 42,43.

Means including input terminals 55 and electrical connecting lines 56 are provided for coupling tracking actuator signals from an actuator servo signal source 57 to the drive coil 50, because of the reciprocating movement of head 25, lines 56 are preferably formed in a flexible signal bus tape harness. As is well known in the magnetic hard disk drive art, the tracking servo signals may comprise analog signals which, in the seek mode, drive head 25 with a controlled acceleration in the first half of the seek operation followed by a controlled deceleration in the second half of the seek operation. As the head approaches the desired track, the servo signal may then switch to a position servo signal in which the position of the head over the track is controlled to find and maintain the center of the desired track. A tracking error signal detected from the reflected optical beam is used for providing actual velocity and position signal in the servo loop which generates the drive signals to input terminals 55.

The invention has been described in detail with particular reference to a presently preferred embodiment, but it will be understood that variations and modifications can be effected within the spirit and scope of the invention.

What is claimed is:

1. Tracking actuator apparatus for an optical beam addressable information storage disk drive system adapted to move a read/write head rapidly along a stroke path parallel with a planar surface of a recording medium and generally parallel with a line normal to a plurality of closely spaced parallel data tracks formed on said planar surface thereby to position a focused optical beam generated within the head on one of said data tracks, said apparatus comprising:

elongated head means for generating said optical beam, said head means having first and second end portions with said optical beam emanating from one of said end portions;

flexure means for suspending said head means with smooth, friction-free translation motion along said stroke path between extremes thereof;

a plurality of magnetic circuit means for establishing mutually isolated magnetic fields across a plurality of elongated air gaps individually disposed on opposite sides of the head means intermediate the end portions thereof, the elongated dimensions of each of said air gaps being parallel with the elongated dimension of said head means and longitudinally centered with respect to the center of said stroke path, each of said magnetic circuit means including an elongated permanent magnet and an elongated flux return pole spaced in parallel from the magnet to form said air gaps, each of said magnets having an air gap face area shaped to have a reduced width at the center relative to the widths of the face at the ends of the magnet to maintain a substantially constant force constant throughout the length of said stroke path;

electromagnetic coil means having a plurality of turns formed coaxially about the longitudinal center line of said head means and secured to the head means intermediate the end portions thereof, said coil means having end turn segments spaced symmetrically away from said head means and disposed in said air gaps, said flexure means suspending said head means with said turn segments centered between the extremes of said stroke path;

and means for supplying tracking actuator signals to said coil means to cause said coil and head means to move longitudinally along said stroke path with a substantially uniform force constant through the full length of said stroke path.

* * * * *